United States Patent [19]

Robinette

[11] Patent Number: 4,947,796
[45] Date of Patent: Aug. 14, 1990

[54] DOG FEEDER APPARATUS

[76] Inventor: Joseph F. Robinette, 5823 F Rd., Bark River, Mich. 49807

[21] Appl. No.: 255,954

[22] Filed: Oct. 11, 1988

[51] Int. Cl.⁵ .......................... A01K 5/00; A01K 7/00
[52] U.S. Cl. ...................................... 119/51.5; 119/61
[58] Field of Search ...................... 119/51.5, 61, 51.11, 119/51.13, 52.1, 72

[56] References Cited

U.S. PATENT DOCUMENTS

| | | | |
|---|---|---|---|
| 2,277,420 | 3/1942 | Stanfield. | |
| 2,537,494 | 1/1951 | Venske. | |
| 2,584,383 | 2/1952 | Feck. | |
| 2,634,706 | 4/1953 | Peterson. | |
| 3,730,141 | 5/1973 | Manning et al. | 119/51.5 |
| 3,782,332 | 1/1974 | Depanthal et al. | 119/51.5 |
| 4,051,812 | 10/1977 | DeLoach et al. | 119/51.11 |
| 4,079,699 | 3/1978 | Longmore et al. | 119/565 |
| 4,192,256 | 3/1980 | Clugston | 119/56.5 |
| 4,315,483 | 2/1982 | Scheidler | 119/51.5 |
| 4,355,598 | 10/1982 | Saylor | 119/52.1 |
| 4,357,905 | 11/1982 | Carpenter | 119/61 |
| 4,572,108 | 2/1986 | Daifodes. | |
| 4,688,520 | 8/1987 | Parks | 119/51.5 |

Primary Examiner—Paul J. Hirsch
Attorney, Agent, or Firm—Leon Gilden

[57] ABSTRACT

A dog feeder apparatus is set forth wherein a plurality of tanks and associated trays are included within the apparatus wherein a water tank provides fluid to a forwardly oriented bowl assembly wherein a dog feeder apparatus accordingly provides a dry-type dog food to a forwardly oriented second bowl apparatus wherein an intercommunicating manually reciprocatable valve enables fluid from the water bowl to enter a perimeter through about the dry dog food bowl to effect moisturizing of the dry dog food.

7 Claims, 4 Drawing Sheets

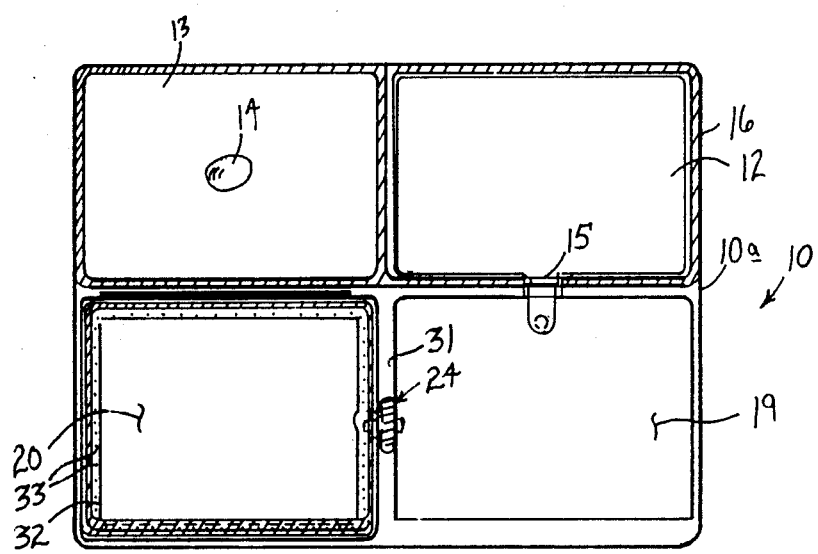
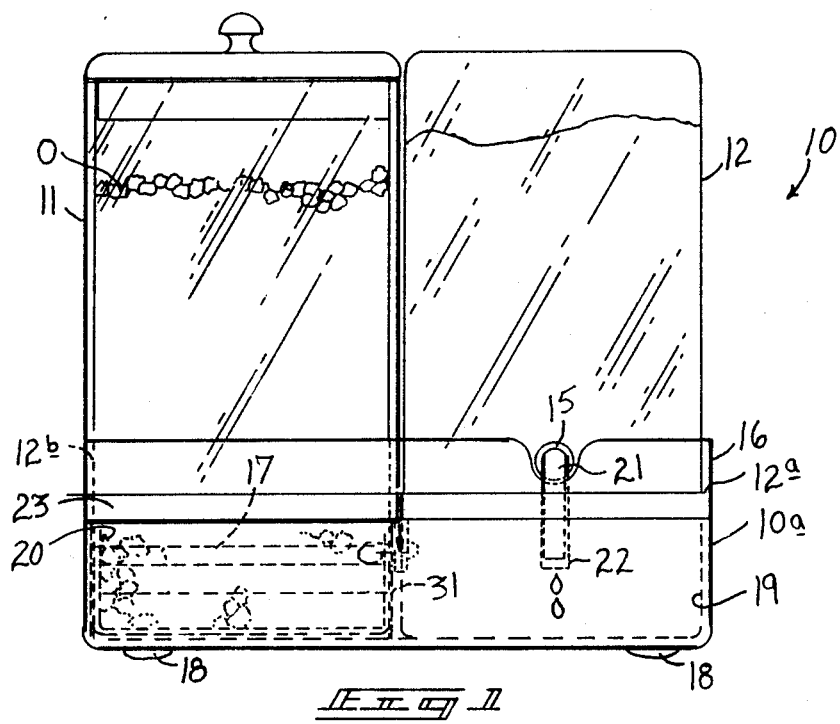

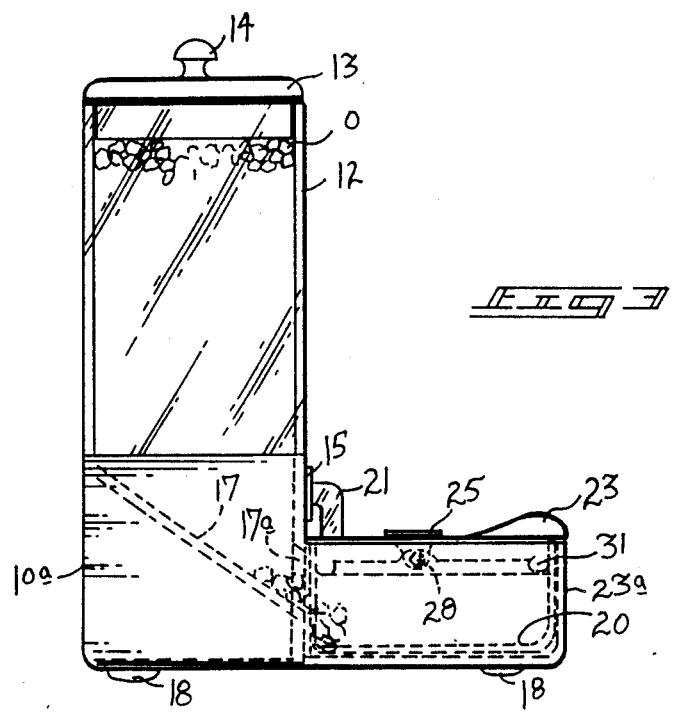
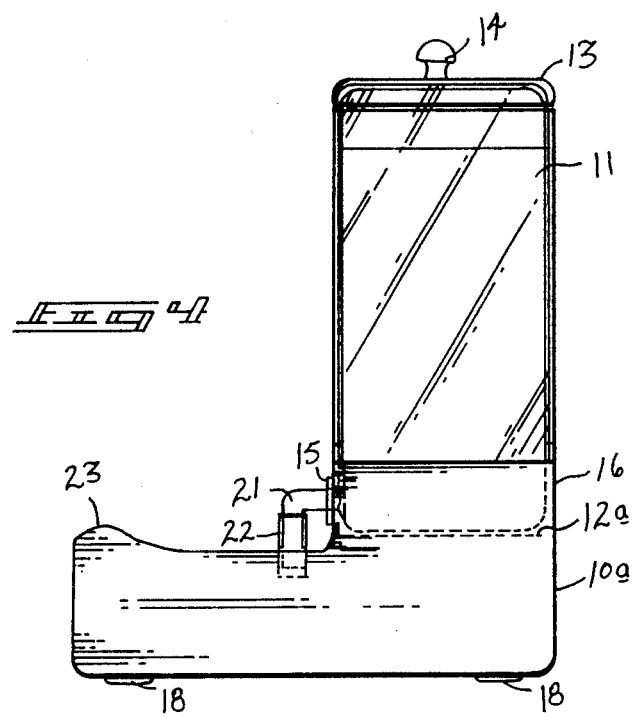

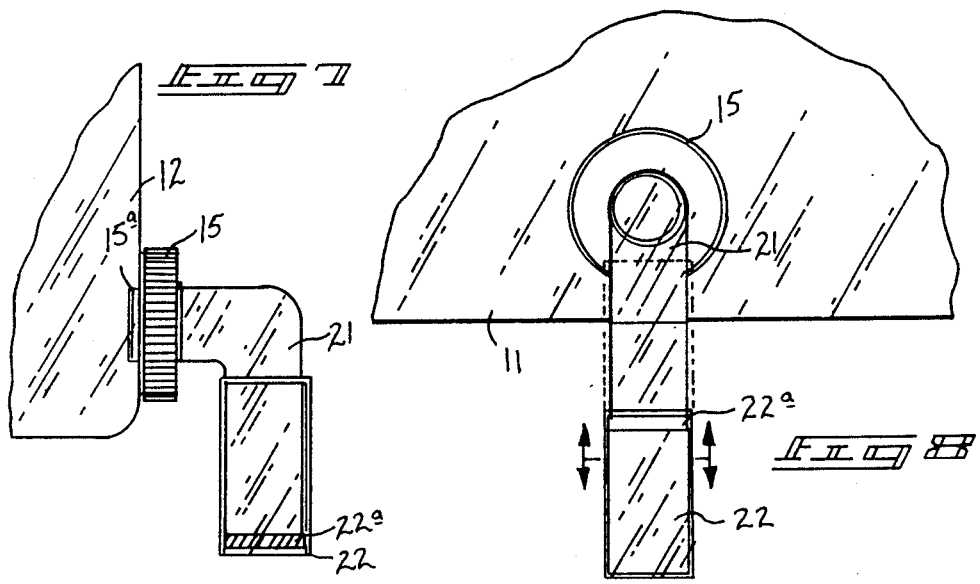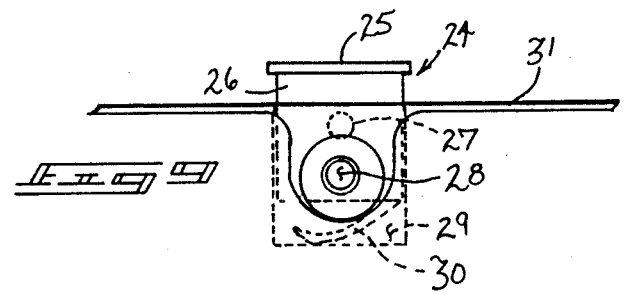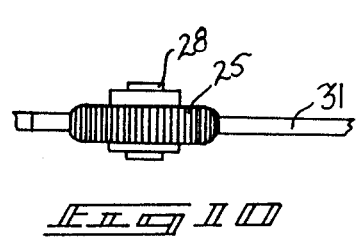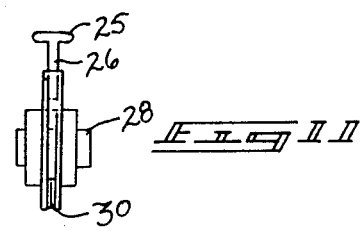

DOG FEEDER APPARATUS

BACKGROUND OF THE INVENTION

1. Field of the Invention

The field of invention relates to dog feed apparatus, and more particularly pertains to a new and improved dog feeder apparatus wherein moisturizing of dry dog food is effected by communication with water from an adjacent water supply source.

2. Description of the Prior Art

The use of dog feeding apparatus is well known in the prior art wherein the "automatic" type of dog feeding apparatus is utilized during prolonged periods of absence by a dog or cat's owner to enable continuous supply of nourishment to the animal. Dry dog food, while being readily utilized, maintains its shelf life for extended periods of time and is therefore utilized by pet owners, but such dog food is enhanced in its reception by a pet when moisture is added. Patents of the prior art have tended to avoid this consideration, whereas it may be noted that automatic pet feeding apparatus has been readily utilized.

For example, U.S. Pat. No. 2,277,420 to Stanfield sets forth a conventional poultry feeder assembly wherein poultry feed is dropped to an associated underlying bin by an overlying storage magazine.

U.S. Pat. No. 2,537,494 to Venske sets forth a rabbit feeder wherein a series of seven storage bins provide sequential feeding of an associate animal wherein seven chambers are utilized to require only weekly filling of the apparatus.

U.S. Pat. No. 2,584,383 to Feck sets forth a fowl drinking fountain wherein an enclosed central chamber includes a directed lower opening to provide fluid about a perimeter trough of the chamber.

U.S. Pat. No. 2,634,706 to Peterson sets forth a delivering hopper and associated trough for the feeding of animals wherein there are means available wherein the compartment for measuring discharging materials from the compartment and provide metered feeding of an associated animal.

U.S. Pat. No. 4,572,180 provides an animal feeder provided with a storage of food therein where the animal's position effects operating a latch from a closed to an open position to release metered portions of food.

As such, it may be appreciated that there is a continuing need for a new and improved dog feeder apparatus which addresses both the problems of storage and dispensing of food in a moisturized form and in this respect, the present invention substantially fulfills this need.

SUMMARY OF THE INVENTION

In view of the foregoing disadvantages inherent in the known types of automatic pet feeding apparatus now present in the prior art, the present invention provides a dog feed apparatus wherein the same effects continuous replenishment of separate water and dry dog food dishes and further enables moisturizing of the dry dog food to enhance its appeal to a pet. As such, the general purpose of the present invention, which will be described subsequently in greater detail, is to provide a new and improved dog feed apparatus which has all the advantages of the prior art automatic dog feeders and none of the disadvantages.

To attain this, the present invention comprises a plurality of storage magazines supply of respective water and dry dog food dishes wherein a valve intercommunicating between adjacent water and dry dog food dishes includes a manually operable valve to enable water to enter a perimeter trough about the dry dog food and moisturize same to enhance its appeal to an animal to be fed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claim be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dog feeder apparatus which has all the advantages of the prior art dog feeder apparatus and none of the disadvantages.

It is another object of the present invention to provide a new and improved dog feeder apparatus which may be easily and efficiently manufactured and marketed.

It is a further object of the present invention to provide a new and improved dog feeder apparatus which is of a durable and reliable construction.

An even further object of the present invention is to provide a new and improved dog feeder apparatus which is susceptible of a low cost of manufacture with regard to both materials and labor, and which accordingly is then susceptible of low prices of sale to the consuming public, thereby making such dog feeder apparatus economically available to the buying public.

Still yet another object of the present invention is to provide a new and improved dog feeder apparatus which provides in the apparatuses and methods of the prior art some of the advantages thereof, while simultaneously overcoming some of the disadvantages normally associated therewith.

Still another object of the present invention is to provide a new and improved dog feeder apparatus to provide separate supplies of water and dry dog food to separate bowls wherein intercommunicating valve enables moisturizing of the dry dog food from the water bowl.

These together with other objects of the invention, along with the various features of novelty which characterize the invention, are pointed out with particularity in the claims annexed to and forming a part of this disclosure. For a better understanting of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic frontal view taken in elevation of the instant invention.

FIG. 2 is an orthographic top plan view of the instant invention.

FIG. 3 is an orthographic right side view of the instant invention taken in elevation.

FIG. 4 is an orthographic left side view of the invention taken in elevation.

FIG. 7 is an orthographic side view of the adjustable spout of the water supply container.

FIG. 8 is a frontal orthographic view of the water supply spout of the instant invention.

FIG. 9 is an orthographic frontal view of the manual water supply valve of the instant invention.

FIG. 10 is an orthographic top view of the manual water supply valve of the instant invention.

FIG. 11 is an orthographic side view of the water supply valve of the instant invention.

DESCRIPTION OF THE PREFERRED EMBODIMENT

Figure 5:
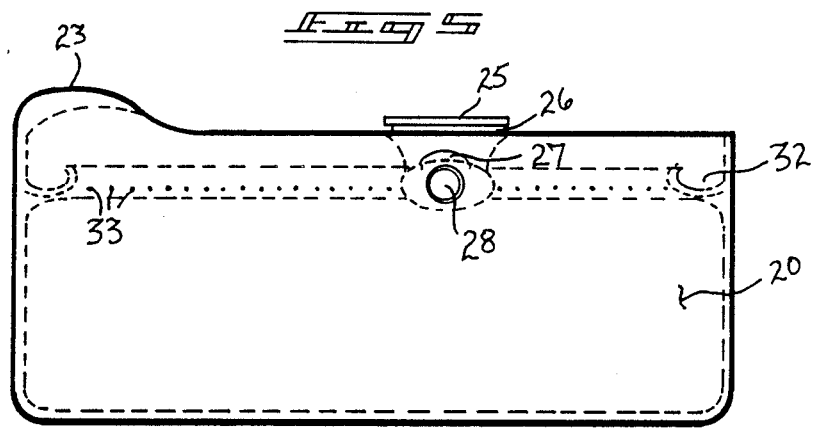
FIG. 5 is an orthographic side view of the dry dog food bowl associated with the instant invention.
Figure 6:
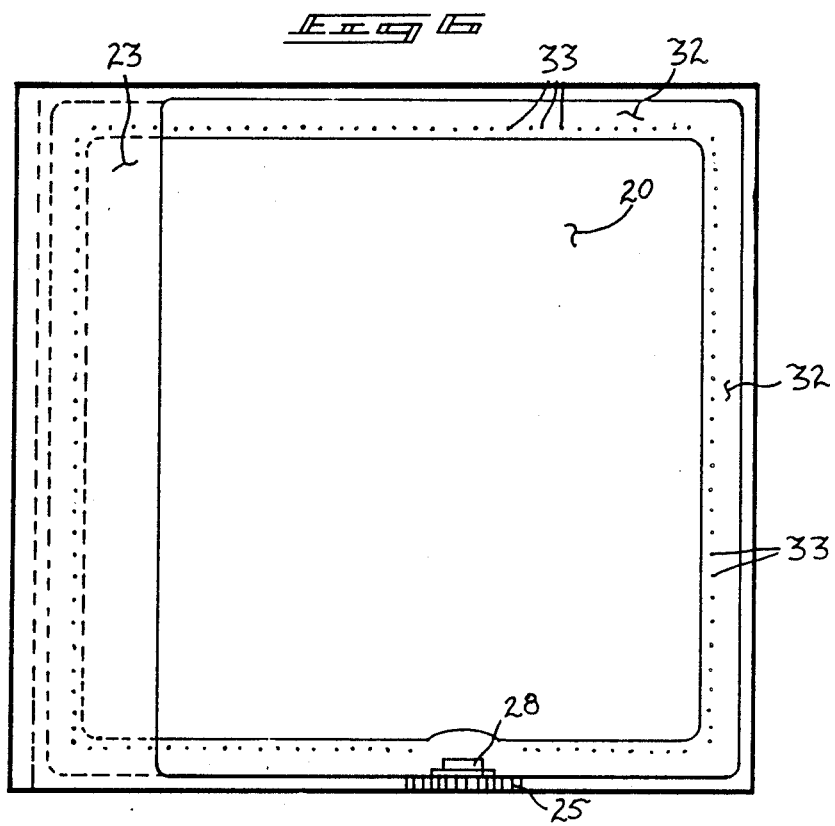
FIG. 6 is an orthographic top view of the dry dog food bowl of the instant invention.

With reference now to the drawings, and in particular to FIGS. 1 to 11 thereof, a new and improved dog feeder apparatus embodying the principles and concepts of the present invention and generally designated by the reference numeral 10 will be described.

More specifically, it may be appreciated that the dog feeder apparatus 10 of the instant invention includes a housing support 10a for slidingly receiving a food supply hopper 11 and a water supply tank 12. The water supply tank 12 is removably positioned within a support cavity 12a formed within the housing support 10a, whereas the food supply hopper 11 is receivable within a further support cavity 12b. A lid 13 and associated integral handle 14 are slidably received within an upper terminal end of the food supply hopper 11 to enable replenishment of dog food "D" within the food supply hopper and accordingly, the removal of the food supply hopper from its associated cavity 12b is only necessary for cleaning purposes. The water supply tank 12 is removable from the support cavity 12a to enable introduction and replenishment of water within the tank 12. Access is attained into the tank 12 by threaded removal of the knurled grip ring 15 that threadedly secures the associated water conduits to deliver water from the tank 12 into its associated trough. Underlying the housing support 10a are a series of friction feet 18 to secure the apparatus 10 on a support surface.

The water supply tank 12 delivers water into a water trough 19 and will present water into the trough 19 to a level determined by the depth of the vertically positionable conduit extendsion 22 formed onto the water conduit 21 secured to the grip ring 15, as illustrated for example in FIGS. 7 and 8. An adjacent food trough 20 is positioned forwardly of its associated food supply hopper 11 with an incline chute 17 formed as the floor of the food hopper 11 to present dog food into the food trough 20 through an opening 17a formed in a rear wall of the trough 19, as illustrated in FIG. 3 for example.

The water conduit 21 and its associated conduit extension 22 includes a friction sealing ring 22a, as illustrated in FIGS. 7 and 8, to sealingly and frictionally secure the relative position of the conduit extension 22 relative to the water conduit 21 to enable an individual to determine the water level to be presented within the water trough 19. An arcuate forward crest 23 is integrally formed onto a forward wall of the housing support 10a, as illustrated in FIGS 3, 4, and 5 for example, to prevent a pet, such as a dog, from undersirably withdrawing food from about the forward wall as the pet leans over the forward wall 23a to gain access to the food and water within troughs 19 and 20.

A valve 24 is positioned within a recess 29 formed within the common divider wall 31 dividing the respective food and watering troughs 19 and 20 and integrally formed as part of the housing support 10a. The valve 24 includes a reciprocatable vertical valve plate 26 formed with a knurled horizontal pressure pad 25 to ease the reciprocation of the valve plate 26. The valve plate 26 is further formed with a valve plate 27 misaligned in a first position from a valve conduit 28 wherein the valve conduit 28 is formed through the common divider wall 31. Upon depressing the valve plate 26 downwardly, as illustrated in FIG. 9 for example, the valve plate opening 27 will align with the valve conduit 28 and enable the flow of water from the water trough 19 about a perimeter trough 32 formed about the upper perimeter of the food trough 20, as illustrated in FIGS. 1, 2, 3, 5, and 6. From the perimeter trough 32, water may seep downwardly onto the dog food "D" through a series of bleeder orifices 33 formed through the bottom floor of the perimeter trough 32. A return leaf spring 30 is oriented and arranged at the lowermost portion of the recess 29 to forcibly reposition the valve plate 26 into its or upper position, as illustrated in FIG. 9, from the second and lower position enabling communication of water through the respective valve conduit 28 and valve plate opening 27.

In this manner, a desired degree of water may be presented onto the dog food and enable continuous moisturization thereof as the bleeder orifices 33 permit only slight seeping of water downwardly onto the dog food "D" and will maintain the dog food in a moistened state for a prolonged period of time.

It should be noted per FIG. 7 that the knurled grip ring 15 is fixedly secured to a threaded boss 15a threadedly receivable within a complementary threaded bore formed within the water supply tank 12 to enable replenishment of water within the tank.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet feeder apparatus for providing a supply of dry food to respective troughs and moisturizing said dry food from one of said troughs wherein said apparatus comprises, a support member for releasably securing a fluid tank and a food hopper therewithin, said fluid tank including an outlet nozzle for providing a predetermined level of fluid within a fluid trough wherein said fluid trough underlies said nozzle, and said food hopper including a diverting plate positioned at a lowermost portion of said food hopper for diverting food from interiorly of said hopper to a food trough communicating with said diverting plate, said food trough and said fluid trough positioned adjacent each other and separated by a common divider wall integrally formed to said support member, and moisturizing means for selectively communicating said fluid trough and said food trough to enable fluid to enter said food trough from said fluid trough, and wherein said moisturizing means includes a manually manipulatable value, and said value is formed within a recess, and said recess is formed within said common divider wall.

2. A pet feeder apparatus as set forth in claim 1 wherein said valve includes a vertically poistionable valve plate wherein said recess includes spring means for biasing said valve plate from an upper first position to a lowered second position to effect communication of fluid between said fluid trough and said food trough.

3. A pet feeder apparatus as set forth in claim 2 wherein said valve plate includes an opening overlying a conduit formed within said common divider wall, and said opening is aligned with said conduit when said valve plate is lowered into a second lowered position.

4. A pet feeder apparatus as set forth in claim 4 wherein a perimeter trough is formed at an upper perimeter of said food trough wherein said perimeter trough is in fluid communication with said conduit formed in said common divider wall, and said perimeter trough further includes a seies of seep holes formed in a floor of said perimeter trough to permit seepage of water onto said dry food.

5. A pet feeder apparatus as set forth in claim 4 wherein said nozzle includes a reciprocatable nozzle extension wherein said nozzle extension includes a friction seal for frictionally retaining said nozzle extension in a predetermined position relative to said nozzzle to enable varying fluid level within said fluid trough.

6. A pet feeder apparatus as set forth in claim 5 wherein said support member further includes an arcuate forward crest formed onto an uppermost portion of a forwardmost wall of the support member to discourage removal of food and fluid from said respective food trough and water trough by a pet.

7. A pet feeder apparatus as set forth in claim 6 wherein said nozzle is fixedly secured to a friction ring for threaded disengagement with said fluid tanks to enable replenishment of fluid within said fluid tank by removal of said nozzle.

* * * * *